United States Patent [19]

Rylander

[11] Patent Number: 5,253,084
[45] Date of Patent: Oct. 12, 1993

[54] GENERAL KERNEL FUNCTION FOR ELECTRONIC HALFTONE GENERATION

[75] Inventor: Richard L. Rylander, Stillwater, Minn.

[73] Assignee: Minnesota Mining and Manufacturing Company, St. Paul, Minn.

[21] Appl. No.: 582,524

[22] Filed: Sep. 14, 1990

[51] Int. Cl.$^5$ .............................................. H04N 1/40
[52] U.S. Cl. ................................... 358/465; 358/298; 358/456
[58] Field of Search ............... 358/454, 456, 457, 298, 358/458, 465

[56] References Cited

U.S. PATENT DOCUMENTS

| | | | |
|---|---|---|---|
| 3,657,472 | 4/1972 | Taudt et al. | 178/6.7 R |
| 3,911,480 | 10/1975 | Brucker | 358/75 |
| 3,997,911 | 12/1976 | Perriman et al. | 358/75 |
| 4,084,183 | 4/1978 | Keller et al. | 358/75 |
| 4,185,304 | 1/1980 | Holladay | 358/298 |
| 4,339,774 | 7/1982 | Temple | 358/456 |
| 4,419,690 | 12/1983 | Hammes | 358/75 |
| 4,443,060 | 4/1984 | Jung et al. | 350/317 |
| 4,456,924 | 6/1984 | Rosenfeld | 358/75 |
| 4,486,788 | 12/1984 | Yamada | 358/298 |
| 4,507,685 | 3/1985 | Kawamura | 358/78 |
| 4,543,613 | 9/1985 | Sakamoto | 358/298 |
| 4,651,228 | 3/1987 | Koch | 358/298 |
| 4,773,734 | 9/1988 | Inoda | 358/298 |
| 4,805,033 | 2/1989 | Nishikawa | 358/298 |
| 4,814,797 | 3/1989 | Haneda et al. | 358/80 |
| 4,894,726 | 1/1990 | Steinhardt et al. | 358/298 |
| 4,920,501 | 4/1990 | Sullivan et al. | 358/457 |
| 4,926,248 | 5/1990 | Kobayashi et al. | 358/75 |
| 4,970,586 | 11/1990 | Sunda et al. | 358/75 |
| 4,987,498 | 1/1991 | Shimazaki | 358/456 |
| 5,055,923 | 10/1991 | Kitagawa et al. | 358/75 |

FOREIGN PATENT DOCUMENTS 2026283A 1/1980 United Kingdom .
2157119A 10/1985 United Kingdom .

OTHER PUBLICATIONS

U.S. patent application U.S. Ser. No. 07/639,962, filed Jan. 11, 1991.
U.S. patent application U.S. Ser. No. 07/639,977, filed Jan. 11, 1991.
U.S. patent application U.S. Ser. No. 07/640,024, filed Jan. 11, 1991.
U.S. patent application U.S. Ser. No. 07/640,025, filed Jan. 11, 1991.

Primary Examiner—Edward L. Coles, Sr.
Assistant Examiner—Jill Jackson
Attorney, Agent, or Firm—Gary L. Griswold; Walter N. Kirn; Eric D. Levinson

[57] ABSTRACT

There is disclosed an algorithm for use with a digitized image which provides a means of simulating a continuous tone image containing a range of gray shades from black to white or a color separation. The "threshold equation" is the key of the invention as it calculates a threshold gray value that is compared to the desired local image value to determine whether that particular point should be "on" or "off". Which points (spots) are "on" and which are "off" is determined by the function that assigns a "threshold" value (the shade at which a pixel changes from "off" to "on") based on a pixels "x" and "y" coordinates.

11 Claims, 6 Drawing Sheets

GENERAL KERNEL FUNCTION FOR ELECTRONIC HALFTONE GENERATION

BACKGROUND TO THE INVENTION

1. Field of Invention

This invention relates to a general halftone generation method in digital image systems. A type of algorithm is used which is capable of generating conventional halftone screen patterns as well as novel patterns which can have performance advantages.

2. Background of the Art

Algorithms are needed which can provide a means of simulating a continuous tone image containing a range of gray shades from black to white, or color separation containing a range of densities of some appropriate colorant. The practical implementation of such an algorithm must rely on a dot pattern defined within a fundamental halftone cell or "glyph" which is a relatively small rectangular array of points.

In the art of printing, half-tone systems have long been used to represent pictorial subjects where tone graduation is important. This was and frequently still is accomplished by the use of a photomechanical system in which a fine cross-hatch screen covers the pictorial image during exposure at a suitable stage in the photographic process leading to the printing plate. By this means the image is divided up into a multitude of regularly spaced very small (subliminal) dots whose size varies with the image density being reproduced. With the use of full color printing of subjects, three or four printing plates, one for each of the separate primary color images have to be prepared. The use of identical half-tone screens for each of these color separations can result in undesirable interactive visual effects including very pronounced and objectionable Moiré patterns when the several successive print impressions are made. These Moiré effects can be reduced to imperceptible levels by crossing the screen directions with one another. In the practice of the art it has long been known that a suitable set of screen angles for four color printing is 45°, 0°, +15°, and −15° (See reference to this art in Chapter 13 of "Principles of Color Reproduction", by J. A. G. Yule, John Wiley & Sons Inc. N.Y., 1967).

In the conventional half-tone system, the original continuous tone picture is represented in the print by regularly spaced high density dots of ink. The dots are sufficiently closely spaced that the unaided human eye cannot distinguish them. The changing size of the dots give the impression of changing tone, and by suitable control of the process the original tones can be reproduced faithfully. With full color originals, suitable control of the process of making the individual half-tone color separations can give faithful reproductions in full color. These photomechanical processes are slow and painstaking, particularly when high quality results requiring considerable manual correction and human judgment are involved.

The transmission of images over telegraph wires based on a process of photoelectric raster scanning was introduced early in the twentieth century. It was also applied to transmitting color images (U.S. Pat. Nos. 2,185,806; 3,413,706). The application of this technique to half-tone plate making by Hardy and others (U.S. Pat. Nos. 2,136,340; 3,190,185; 2,294,644) heralded an era of faster and more automatic plate making and correction. Methods were developed for scanning colored originals (U.S. Pat. Nos. 2,165,168; 2,253,086; 2,571,322) and treating the readings and output by analog devices to produce color separations suitable for color printing plate making with a considerable saving in time.

The combination of these two techniques for the making of color half-tone images was found to suffer from interactive visual effects including the Moiré pattern problem known earlier to photomechanical plate makers. Wurzburg (U.S. Pat. No. 2,185,139) made color half-tone separations by the photoelectric raster scanning devices to give different equivalent screen angles for the different colors. Screen angle choice was based on the photomechanical art already existing.

In the photoelectric raster scanning systems, conversion of analogue scanning signals to digital form was found to facilitate manipulation of the signals by computing circuits, as in the electronic formation of half-tone dot patterns (U.S. Pat. No. 3,629,496). Such methods gave color originals suffering from interactive visual effect such as Moiré patterns in the resulting prints. Patterns of dots of equal size but with separation distances depending on density in the original were found to reduce the Moiré patterns (U.S. Pat. Nos. 3,197,558; 3,580,995) because of the absence of repeating patterns of dots. Direction simulation of the use in color work of four contact screens at different screen angles has been achieved by computing techniques coupled with four different dot generators (U.S. Pat. No. 3,911,480). Choice of the angles used is based on earlier experience with contact screens.

A different approach has been taken to the problems presented by photoelectric scanning methods. This involves the representation of a variable size half-tone dot by a matrix of smaller dots whose number in the matrix is varied to provide half-tone dot size changes and therefore density changes. (U.S. Pat. Nos. 3,604,486; 4,439,789). No change of size or optical density of these smaller dots is involved. Only their presence or absence is considered. This system therefore lends itself to the use of digital signals and their attendant high speed computing means. Enhanced tonal reproduction has been achieved by using a variable pixel area (the area assigned to a single matrix unit) in such matrix systems (U.S. Pat. No. 4,084,259).

In four color printing the separations have been represented by matrix pixels in which the distribution of dots for the same density is varied from one separation to another. This is said to reduce Moiré effects (U.S. Pat. No. 3,922,484). This technique of Moiré reduction has been expanded by randomizing the distribution of dots in the pixel matrix (U.S. Pat. No. 4,468,706) building on earlier monochrome work (U.S. Pat. No. 3,629,496).

The randomized pixel matrix method of reducing Moiré effects has been approached in a separate manner often termed "ordered dither". The raster scan identifies signals corresponding to all the dot positions in the pixel matrix but the presence or absence of a dot in the reproduction is determined by a predetermined matrix of threshold values—one for each dot position in the pixel matrix (U.S. Pat. Nos. 4,193,096; 4,342,051; 4,496,987).

As was reported above, U.S. Pat. Nos. 2,185,139 and 3,911,480 describe raster scan methods to reduce Moiré effects which generate half-tone screen dots with different screen angles for the different color separations. This method has been enhanced in U.S. Pat. No. 4,419,690. A variation to this method has been taught in U.S. Pat. No. 4,443,060 wherein quadratic raster meshes of adjacent dots are expanded to contracted in their two diagonal directions. Different expansions/contractions are used for the different color separations.

The non-patent literature contains considerable detailed discussion of the application of raster scanning to half-tone image production. The following papers are representative: "Half-tone method with Edge Enhancement and Moiré Suppression", P. G. Roetling, JOSA 66, 985 (1976). In this method, detail corresponding to the spatial frequency of the half-tone screens is suppressed. "Random Nucleated Halftone Screen," J. P. Allebach, PS & E 22.89 (1978). These screens suppress Moiré effects by the introduction of random elements.

"An Optimum Algorithm for half-tone Generation for Displays and Hard Copies," T. M. Holladay, Proc. Soc. for Information Display, 21., 185 (1980). This describes electronically produced screens with different screen angles.

"A New Evaluation Method of Image Quality of Digital Halftone Images Obtained by Ordered Dither Method", K. Kinoshita et al., J. Imaging Technology, 10.181 (1984).

U.S. Pat. No. 4,758,886 approaches the problem of Moiré fringes in color half-tone images from the standpoint that the mathematical functions describing the half-tone patterns for the individual separations should be orthogonal with one another. These appears to have been no earlier disclosure of such an approach and none of the mathematical investigations in the literature suggest such an approach.

The patent describes a method of designing screen functions for raster-scan generated sets of image comprising two or more color separation images, which sets of generated images have reduced Moiré patterns or are free from Moiré pattern problems. The method does not use the equivalent of different screen angles for the separations nor is the technique of ordered diether used. The half-tone dot matrixes in a given separation are disposed at a single uniform pitch not at variable pitch as taught in some of the known art.

SUMMARY OF THE INVENTION

The invention offers a method of general halftone generation using an algorithm which is capable of generating conventional halftone screen patterns as well as novel patterns which may have performance advantages in some situations. Halftone patterns are made up of "rows" and "columns" of dots where traditional patterns keep the rows and columns perpendicular to one another and with equal spatial dot densities ("dots per unit length") along the corresponding directions. The algorithm in this invention is based on direct modification of the "x" and "y" frequency components of halftone dot patterns, is very flexible in allowing independent adjustment of the row and column directions and while these angles are still restricted to those with rational tangents they need not be perpendicular, and also allows unequal densities along those directions. The halftone dot centers of this invention do not necessarily have to be located at the intersections of integral numbers of pixels.

This algorithm provides a means of simulating a continuous tone image containing a range of gray shades from black to white, or a color separation containing a range of densities of some appropriate colorant on a printing engine capable of only bilevel control of density at discrete points in a Cartesian grid that is typically addressed by scanning in a raster fashion. The heart of the process begins with the given coordinates of any addressable point on the page, calculates a threshold gray value that is compared to the desired local image value to determine whether that particular point should be "on" (by placing a full-density mark on the page at that location) or "off". Which points (spots) are "on" and which are "off" is determined by the function that assigns a "threshold" value (the shade at which a pixel changes from "off" to "on") based on a pixels "x" and "y" coordinates.

The algorithm used in this invention provides a basis for halftone dot generation in a variety of styles using a fairly simple function which could be adapted to implementation in several Raster Image Processor (RIP) architectures. While capable of generating several halftone patterns currently used in the art, an advantage of this invention is the ability to produce new halftone patterns which have improved performance.

The algorithm in this invention is very flexible in allowing independent adjustment of the row and column directions (which need not be perpendicular), and unequal densities along those directions. As one particular special case, the algorithm allows implementation of the halftone patterns described in the 3M patent: "Optimal Color Halftone Patterns for Raster-scan Images" (U.S. Pat. No. 4,758,886). The algorithm in this invention also contains a parameter to set the "eccentricity" of dots to produce patterns with "elliptical" dots that will "link" or "chain" along one direction (row or column) before the other to minimize the "optical jump" in midtone shades.

This invention offers an algorithm technique and is capable of implementation into standard PostScript-compatible printers, without the need for specialized halftone generation hardware.

DEFINITION OF TERMS

Pixel: An abbreviation for "Picture-Element". A photographic image is continuous spatially and tonally. Once "digitized" the image is quantized tonally into discrete gray levels, and spatially into discrete "pixels". A "pixel" is related only to the sampling of the original image, it does not necessarily have any fixed relationship to "Dots" or "Spots" or "Points" in a printer or display device.

Point: A mathematical construct. A "point" is simply a location in space (in a two-dimensional plane here since we are talking about images) described by a pair of coordinates. Printer "resolution" is typically specified in "dpi" (dots per inch), but this number is really just the addressability of the printer (i.e., the "Points per inch" in the x and y directions the printer can address). True printer resolution depends not only on its addressability, but on the size of printed dots placed at those addressable points in an image.

Spot: A "point" that has been turned "on" or "imaged" by printing a small black disk (typically) at the "point" coordinates on a page. A printer's addressability might be specified in "spots per inch", but its true resolution is more properly given in "resolvable spots per inch" (which might be considerably less if the imaged "spot" size (diameter) is much greater that the addressability (distance to the next addressable "point").

Dot: A "Halftone Dot: made up of a multiplicity of "points" or "spots". The "dot" is not a fixed size or number of spots/points but changes as a function of gray shade to be simulated.

Halftone Cell: An array of points that is used to control the geometric arrangement and relative numbers of "on" ("black") and "off" ("white") "spots" in a halftone image. A halftone cell can be thought of as a small, usually square matrix of threshold values that are compared to some local pixel shade to determine which "spots" within the "cell" are "on" and which are "off" for a particular shade representation. For a "cell" made up of n×n "elements" (or "spots" or "Points"), there will be $n^2+1$ shades that may be represented (from "black"=all spots on, to "white"=all spots off, inclusive).

Glyph: A full halftone pattern would then consist of $n^2+1$ bitmap representations of the cell with an individual representation called a "glyph". The "glyphs" increase the speed of the halftoning process by precomputing the patterns of "on" and "off" spots within a "cell" for all possible shades.

Depending on the final scale of the halftone image and the number of pixels in its digitized representation, individual pixels may correspond to entire "glyphs" or multiple glyphs, or each glyph may be subdivided so that only a portion of an appropriate glyph for the local pixel shade is used in that region of the image bitmap.

In any case, the portions of subdivided glyphs, or combinations of multiple glyphs are arranged so that the underlying threshold values correspond to a uniform edge-to-edge tiling of the original halftone cell over the entire image area.

DETAILED DESCRIPTION OF THE INVENTION

A desired algorithm provides a means of simulating a continuous tone image containing a range of gray shades from black to white, or a color separation containing a range of densities of some appropriate colorant on a printing engine capable of only bilevel control of density at discrete points in a Cartesian grid that is typically addressed by scanning in a raster fashion. The heart of the process is a "threshold equation" that, given the coordinates of any addressable point on the page, calculates a threshold gray value that is compared to the desired local image value to determine whether that particular point should be "on" (by placing a full-density mark on the page at that location) or "off".

The end result of this invention is an algorithm capable of generating patterns better suited to the nature of raster-scan devices, and flexible enough to allow optimizing the patterns for particular printers or specific images. While capable of reproducing halftone screens currently used in the art, this algorithm is not limited to patterns that rely on simple rotation of conventional screens. The algorithm of the present invention can be used in many various raster scanned or laser addressed imaging systems to improve image quality. The image information is first accessed, either from stored information or direct reading from a reader. The accessed information is then reviewed by the algorithm so that improved image pattern data is obtained. This improved image pattern data is then used to drive a printing engine, e.g., a laser printer, laser imager (for full color silver halide images as in U.S. Pat. No. 4,619,892), e-beam images, etc. Either developable (e.g., latent silver halide or latent electrostatic) images may be generated or actual direct visible images (leuco dye bleach, dye bleach, direct print out) may be created.

The invention is a process for automatically generating halftone dot images, or "glyphs", which are particular arrangements of white and black spots in a square n×n array of bilevel spots, simulating various intermediate shades. Which pixels are "on" and which are "off" for a particular shade is determined by the function that assigns a "threshold" value based on spots x and y coordinates.

The particular threshold equation described here produces a final bilevel, halftone image made up of an array of "dots" (clusters of "on" or black points) of varying size as in a conventional halftone process, but with a unique and very flexible means of controlling the orientation and spacing of the "rows" and "columns" of dots making up the image. The great variety of halftone dot patterns that may be generated by this equation has particular application in color printing where the various halftone color separations are reproduced with a mixture of patterns in an effort to minimize moiré effects and color changes due to registration errors in the printing process.

A practical implementation of this algorithm relies on a dot pattern defined within a fundamental halftone cell or "family of glyphs" which is a relatively small rectangular array of points addressable by a raster scan printing engine (e.g., a laser scanner, ink jet printer, thermal printer, or other printer or imaging device that forms an image by controlling the densities of discrete points in a Cartesian grid). The threshold equation is used to assign a gray value to each addressable point in the fundamental halftone cell and a full set of glyphs for a particular pattern is created by finding all the "on" points within the cell for varying levels of gray.

The threshold equation produces patterns that have multiple dots per cell arranged in "rows" and "columns" oriented and spaced to form a proper continuation of the pattern as a half-tone image is formed by tiling appropriate glyphs edge-to-edge.

A typical halftone fundamental cell will be a small square array of addressable points where the "x" and "y" coordinates of the points within the cell are scaled so that the cell itself extends from −1 to 1 in both the "x" and "y" directions.

The points within the fundamental cell are ranked to determine the order in which spots at those locations change from "off" to "on" as shade values vary from white to black according to their "x" and "y" coordinates through the threshold equation:

$$\text{Threshold}(x,y) = \text{Comb}(\text{Row\_fn}(A_x{}^*x + A_y{}^*y), \text{Col\_fn}(B_x{}^*x + B_y{}^*y))$$

The "Comb()" function is some rule for combining the inner "Row_fn()" and "Col_fn()" functions such as summation, multiplication, or comparison (taking the maximum or minimum of the two). The "Row_fn()" and "Col_fn()" functions are periodic functions with period [−1,1] matching that of the fundamental halftone cell. The arguments to the "Row_fn()" and "Col_fn()" functions, $(A_x*x+A_y*y)$ and $(B_x*x+B_y*y)$, respectively, determine how the "rows" and "columns" of halftone dots are arranged within the cell.

The basic geometry of the "Threshold (x, y)" equation applied to raster points within the fundamental halftone cell is a sinusoidal modulation of threshold values along "rows" and "columns" that are defined in terms of their spatial frequency components in the x and y directions. For example, if the parameters Bx and By are both zero, there will be only a "row-wise" modulation of threshold values producing halftone patterns that shade by means of parallel lines of varying thickness.

Figure 1A:
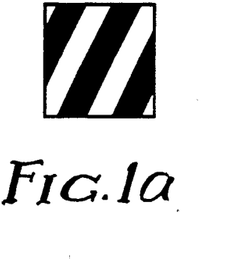
FIGS. 1a, 1c, 2a, 3a, 4a, 4c, 5a, and 5c show fundamental half-tone cells used in multicolor printing.
Figure 1B:
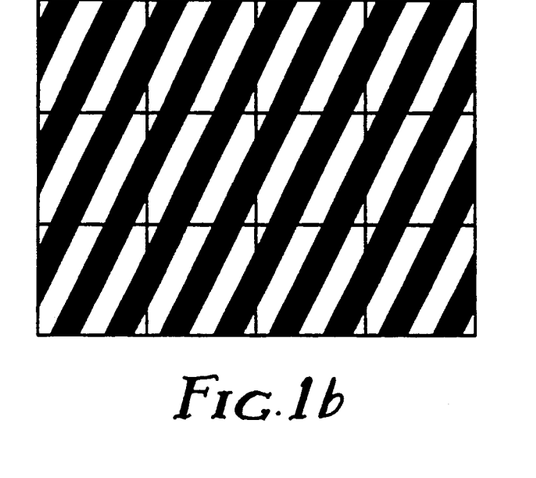
FIGS. 1b, 1d, 2b, 3b, 4b, 4d, 5b, and 5d show arrays of fundamental half-tone cells used in multicolor printing.
Figure 1C:
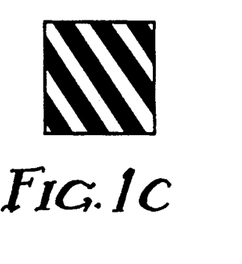
Figure 1D:
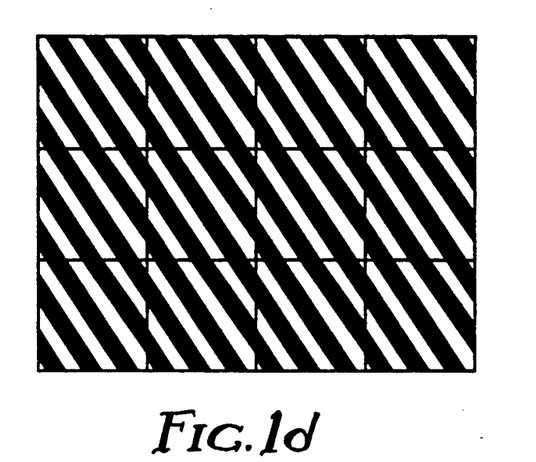

The slope of the lines will be given by $A_x/A_y$ with a path from $x=-1$ to $x=1$ (holding $y=0$) intersecting $A_x$ halftone pattern lines, and a path from $y=-1$ to $y=1$ (holding $x=0$) intersecting $A_y$ halftone pattern lines. In FIG. 1 below, the shade value is a 50% gray; half of the addressable points within the halftone cell are "on" (black) and half are "off" (white). In the fundamental halftone cell of 1a), $A_x=2$, $A_y=1$, $B_x=0$, $B_y=0$. In the fundamental halftone cell of 1c), $A_x=3$, $A_y=2$, $B_x=0$, $B_y=0$.

Similar patterns may be produced by setting $A_x$ and $A_y$ equal to zero, varying just $B_x$ and $B_y$ (patterns with only "columns"), or by keeping $A_x=B_x$ and $A_y=B_y$ ("rows" and "columns" coincident).

More interesting patterns are those that have intersecting "rows" and "columns" producing separated dots within the halftone cell. In this case, the number of dots per cell is given by:

$$\text{dots per cell} = |A_x*B_y - A_y*B_x|$$

Figure 2A:
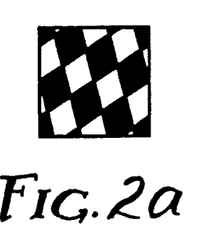
Figure 2B:
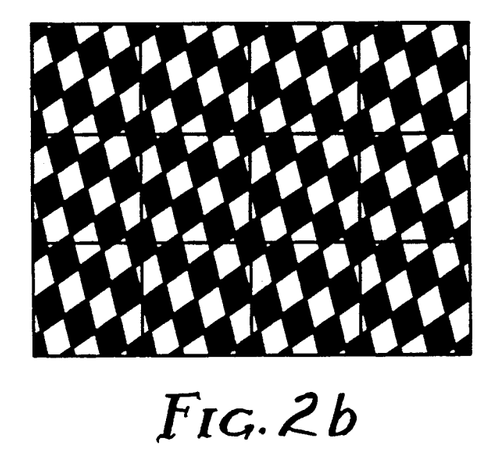

For example, in FIGS. 2a and 2b, the fundamental halftone cell is $A_x=3$, $A_y=1$, $B_x=1$, $B_y=-2$.

The dots per cell for this example is 7 (6 "inside" the cell and one at the corners). The same equation holds for all cases though in the previous "row-only" or "column-only" line patterns the result will always be zero "dots per cell" as there are no separated "dots".

Figure 3A:
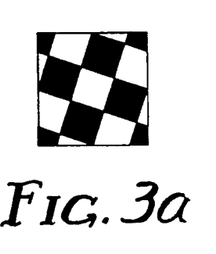
Figure 3B:
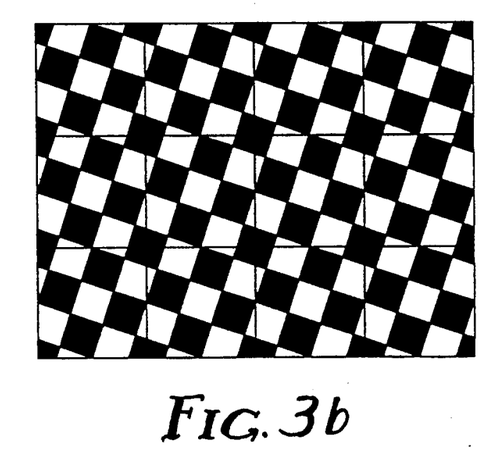

The basic threshold equation is very flexible allowing completely new and unique dot patterns to be generated. It can also be used to simulate prior art halftone patterns by imposing certain restrictions on the relationships of the parameters $A_x$, $A_y$, $B_x$, and $B_y$. For example, the halftone screens described in U.S. Pat. No. 4,084,183 (approximating a traditional halftone screen where the rows and columns of dots have the same dot density, are perpendicular, but are rotated with respect to the Cartesian grid of addressable points by an angle with a rational tangent) may be produced by restricting $A_x=B_y$ and $A_y=-B_x$ (or equivalently, $A_x=-B_y$ and $A_y=B_x$). This restriction forces the slope of the rows to be the negative reciprocal of the column slope (ensuring orthogonality), and results in the same dot density along the rows and along the columns, as in FIGS. 3a) and 3b):

In FIG. 3, the fundamental halftone cell is $A_x=-2$, $A_y=1$, $B_x=1$, $B_y=2$.

Two advantages this method has over that shown in U.S. Pat. No. 4,084,183 is that the fundamental halftone cell can be made larger (containing more addressable points, thus allowing more shades of gray to be simulated) while maintaining the same effective dot pitch or density since cells with multiple dots are produced, and the fact that the centers of gravity of neighboring dots do not necessarily have to be separated by integral numbers of "rise" and "run" addressable points (an added degree of freedom in these "conventional" patterns).

Figure 4A:
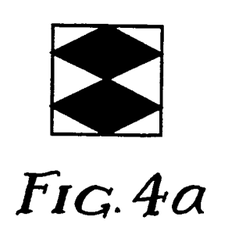
Figure 4B:
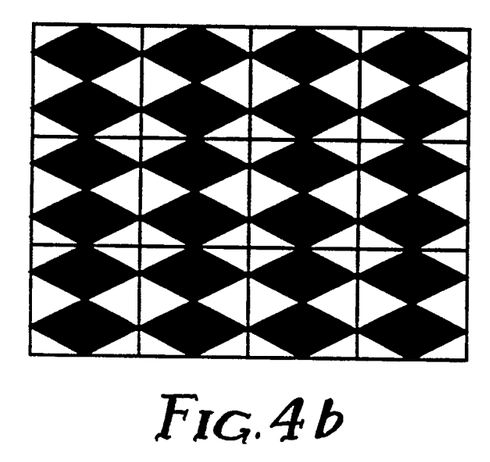
Figure 4C:
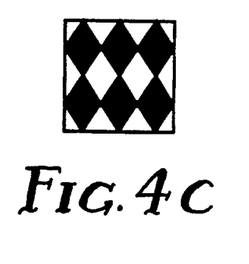
Figure 4D:
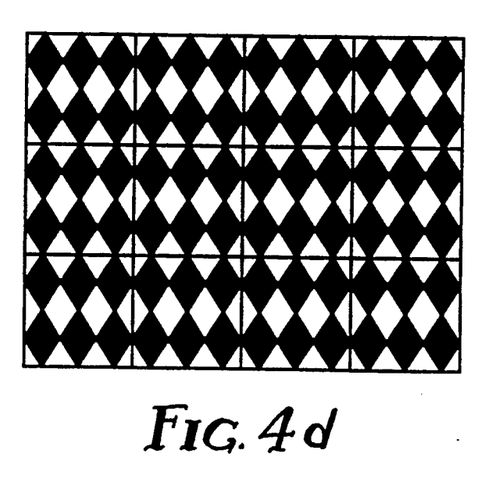

Another prior art class of halftone patterns is that described in U.S. Pat. No. 4,758,886. Here the emphasis is on mixtures of halftone patterns for color printing that are spatially decoupled through various combinations of spatial frequencies within the dot patterns rather than relying on the more traditional method of screens rotated at specific angles. Halftone patterns for various colors may be placed at the same angle (in particular 0° which is particularly well suited to raster scan devices), but with different dot spatial densities in the x and y directions to vary the dot overlap between colors and minimize sensitivity to color-to-color registration. These patterns may be produced by this threshold equation by setting $A_y=0$ and $B_x=0$ so that the rows and columns of dots are strictly horizontal (along the x axis) and vertical (along the y axis).

As shown in FIG. 4, the fundamental halftone cells of 4a) and 4b) are $A_x=1$, $A_y=0$, $B_x=0$, $B_y=2$ and $A_x=3$, $A_y=0$, $B_x=0$, $B_y=2$, respectively.

An alternate pattern described in U.S. Pat. No. 4,084,183 produces a familiar "checkerboard" dot arrangement, but with different frequencies in the x and y directions. These patterns are produced by restricting $A_x=B_x$ and $A_y=B_y$ (or equivalently, $A_x=-B_x$ and $A_y=B_y$). Here in FIG. 5, the slope of the rows of dots is always the negative of the column slope.

Figure 5A:
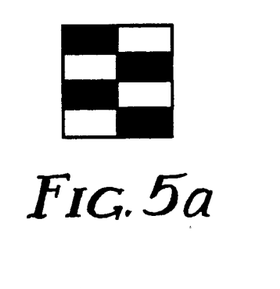
Figure 5B:
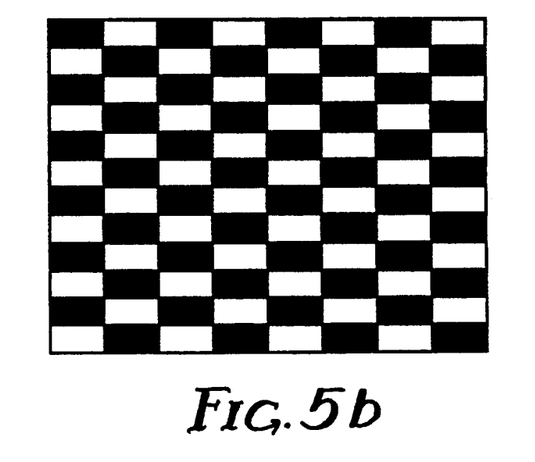

In FIG. 5a the fundamental halftone cell is $A_x=1$, $A_y=2$, $B_x=1$, $B_y=-2$.

Figure 5C:
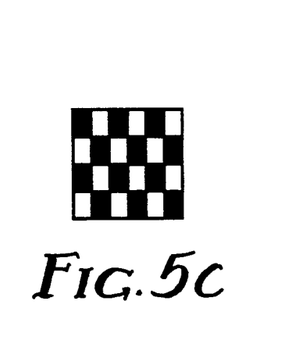
Figure 5D:
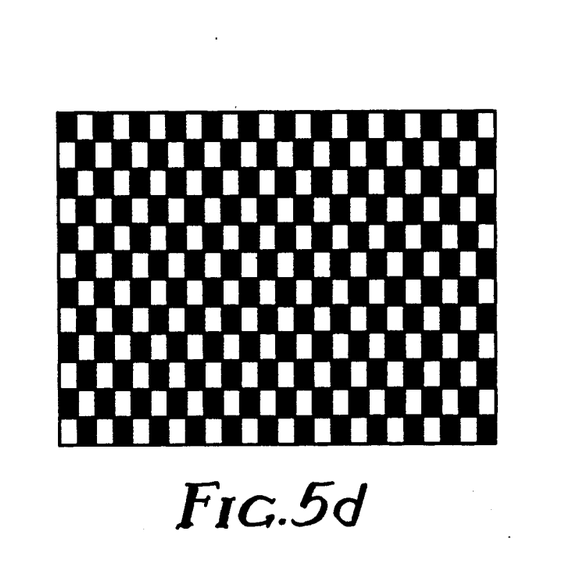

In FIG. 5c) the fundamental halftone cell is $A_x=3$, $A_y=2$, $B_x=3$, $B_y=-2$.

The glyph tiling process that generates a full halftone image need not necessarily assign a complete glyph (full fundamental halftone cell) to each pixel (discrete sample of a continuous tone image). Depending on the resolution (number of discrete pixel samples) of the continuous tone image, the mapping of halftone glyphs to the final bilevel image may require multiple glyphs per pixel, or if enough continuous tone image pixels are available, the glyphs themselves may be subdivided for a multiple pixel per glyph mapping.

A typical halftone fundamental cell will be a small square array of addressable points where the x and y coordinates of the points within the cell are scaled so that the cell itself extends from −1 to 1 in both the x and y directions. The points within the fundamental cell are ranked to determine the order in which spots at those locations change from "off" to "on" as shade values vary from white to black according to their "x" and "y" coordinates through the threshold equation:

$$\text{Threshold}(x,y) = \text{Comb}(\text{Row\_fn}(A_x*x+A_y*y), \text{Col\_fn}(B_x*x+B_y*y))$$

The "Comb()" function is some rule for combining the inner "Row_fn()" and "Col_fn()" functions such as summation, multiplication, or comparison (taking the maximum or minimum of the two). The "Row_fn()" and "Col_fn()" functions are periodic functions with period [−1,1] matching that of the fundamental halftone cell. The arguments to the "Row_fn()" and "Col_fn()" functions, $(A_x*x+A_y*y)$ and $(B_x*x+B_y*y)$, respectively, determine how the "rows" and "columns" of halftone dots are arranged within the cell. An example threshold function using the well-known cosine function is:

$$\text{Threshold}(x,y) = Ecc^* \cos(\pi^*(A_x^*x + A_y^*y)) + \cos(\pi^*(B_x^*x + B_y^*y))$$

where the arguments to the cosine functions have been scaled by $\pi$ to make the function's period match the $[-1,1]$ cell size.

The "$A_x$" and "$A_y$" parameters determine the "x" and "y" spatial frequency components (respectively) of the "rows" of halftone dots, and the "$B_x$" and "$B_y$" parameters determine the "x" and "y" spatial frequency components (respectively) of the "columns" of halftone dots (spatial frequencies here being given in terms of "cycles per cell").

The combining function in this case is simple summation with the "Ecc" scale factor determining the influence of the "Row_fn()" contribution relative to the "Col_fn()". "Ecc" is normally equal to 1.0, but if set to a value slightly greater or less that 1.0, the dot shapes will be distorted, causing a "linking" or "chaining" of the dots along the "row" or "column" direction for midtone shades, minimizing the "optical jump" that is sometimes seen as an abrupt change in density at the 50% dot where the transition from separated "dots" to separated "holes" occurs.

The threshold equation requires a periodic function similar to the well known cosine function, but with a fundamental period from $-1$ to $1$ (matching the range of coordinates within the fundamental halftone cell).

The cosine function itself with a period of $2\pi$ (which can be taken as the interval $[-\pi, \pi]$) could be used if its arguments are scaled by a multiplication by $\pi$, but a preferred implementation uses a simple quadratic function, "para(x)" which approximates the cisine function and has a natural fundamental period in the interval $[-1, 1]$. This is much easier to calculate in practice and can be defined as a splicing of simple parabolic sections as:

$$\text{para}(x) = \begin{cases} 0.25 - x^2, & |x| \leq 0.5 \\ (1 - |x|)^2 - 0.25, & 0.5 < |x| \leq 1 \\ \text{para}(x + 2n), & n = 0, \pm 1, \pm 2, \ldots \end{cases}$$

Once the periodic "para(x)" function has been defined, the threshold equation can be given by:

$$\text{Threshold}(x,y) = Ecc^* \text{para}(A_x^*x + A_y^*y) + \text{para}(B_x^*x + B_y^*y)$$

The parameter "Ecc" controls the eccentricity of dots ("Ecc" not equal to 1.0 generates elliptical dots), the parameters $A_x$ and $A_y$ control the slope (given by $A_x/A_y$ since the "A" and "B" parameters are in units of reciprocal length ["cycles per cell"]) and spacing of "rows" of dots (there will be $A_x$ "rows" of dots in the x interval $[-1,1]$, and $A_y$ "rows" of dots in the y interval $[-1,1]$), and the parameters $B_x$ and $B_y$ similarly control the slope and spacing of "columns" of dots. The "Ecc" parameter is a real number (usually close to 1.0), but the parameters $A_x$, $A_y$, $B_x$ and $B_y$ must be integers for proper matching of the dot patterns from glyph to glyph. This restricts the effective angles of the "rows" and "columns" to those with rational tangents, but they need not bear any special relationship to the actual number of addressable points within the fundamental halftone cell. More importantly, the "rows" and "columns" need not be perpendicular to one another and they need not have the same spatial frequency.

Figure 6A:
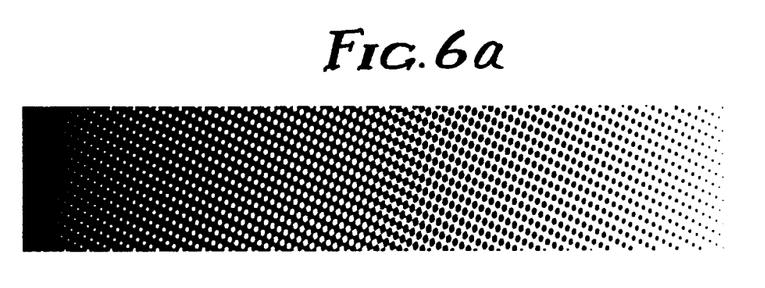
FIGS. 6a–c show dot patterns demonstrating the effect of the Ecc parameter.
Figure 6B:
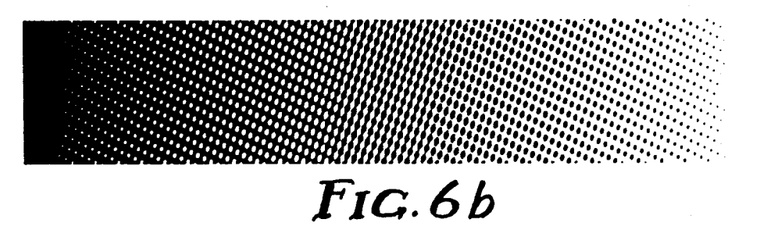
Figure 6C:
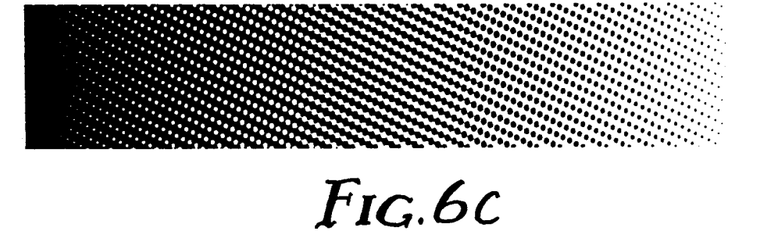

The Threshold Equation for Modifying the Dot Shape $$\text{Threshold}(x,y) = Ecc^* \text{para}(A_x^*x + A_y^*y) + \text{para}(B_x^*x + B_y^*y)$$

with the "Ecc" parameter set equal to 1.0 produces halftone patterns where the dots progress from small circular or elliptical disks (depending on the relative x and y spatial frequency components) in the highlight shades to parallelograms with all four vertices touching neighboring dots at the 50% gray midtone to small circular or elliptical holes in the dark shadow tones. Changing "Ecc" to values different from 1.0 will slightly distort the dot shapes causing the midtone dots to join or chain in the "row" (if Ecc > 1.0) or "column" (if Ecc < 1.0) direction. The following examples in FIG. 6 all use the same pattern parameters:

$$A_x = 3, A_y = 1, B_x = 1, B_y = -2.$$

In 6a) Ecc is 1.0, in 6b) Ecc is 1.25, and in 6c) Ecc is 0.75.

Another way to modify the dot shape is to replace the "para(x)" function in the threshold equation by another periodic function. The "tri(x)" function defined below produces dots that maintain a parallelogram shape from bright highlight to dark shadow tones and still exhibit the "Ecc" controlled distortion that allows chaining along rows or columns.

$$\text{tri}(x) = \begin{cases} 0.25 - |(x/2)|, & |x| \leq 1.0 \\ \text{tri}(x + 2n), & n = 0 \pm 1, \pm 2, \ldots \end{cases}$$

Figure 7A:
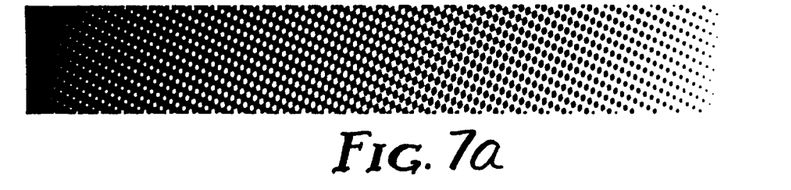
FIGS. 7a–c show dot patterns having the same row and column patterns and Ecc parameter of FIG. 6, but having different dot shapes.
Figure 7B:
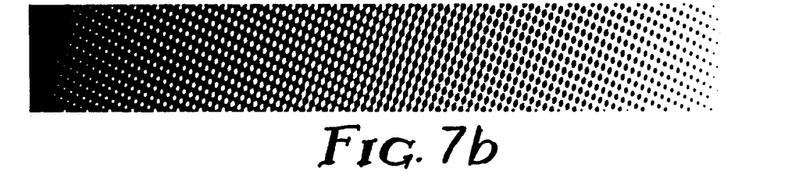
Figure 7C:
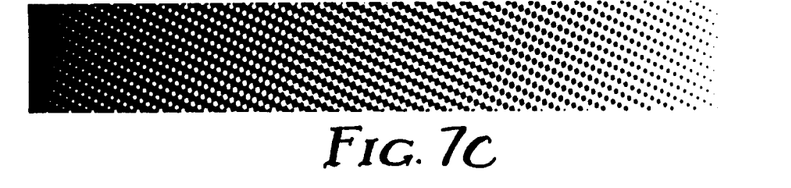

Redefining the threshold function as:

$$\text{Threshold}(x,y) = Ecc^* \text{tri}(A_x^*x + A_y^*y) + \text{tri}(B_x^*x + B_y^*y)$$

the previous dot patterns become those of FIG. 7a), b) and c), with corresponding value of Ecc is 6a) and 7a), 6b) and 7b), and 6c) and 7c).

Yet another method to change the shapes of halftone dots is to modify the threshold equation so that instead of taking the sum of the "row" and "column" "tri(x)" functions we compare the two terms and take their maximum or minimum. This leads to dot patterns that have a intaglio-like appearance where the parallelogram shaped dots do not join at their vertices in the midtones, but are oriented so that they are separated by parallel lines of varying thickness.

Figure 8A:
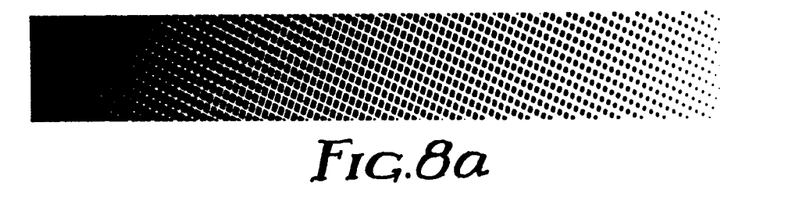
FIGS. 8a–b show dot patterns having the same row and column patterns of FIG. 6, but having different dot shapes.
Figure 8B:
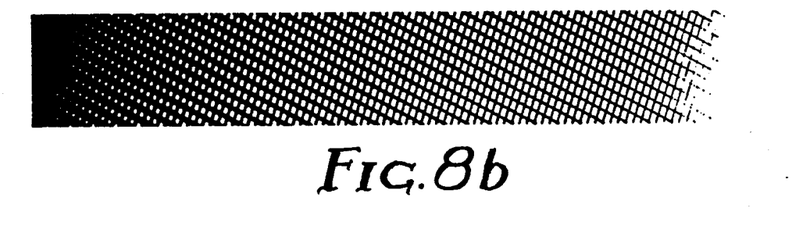

Redefining the threshold equation as $$\text{Threshold}(x,y) = \text{Maximum}(\text{tri}(A_x^*x + A_y^*y), \text{tri}(B_x^*x + B_y^*y))$$

with the same $A_x$, $A_y$, $B_x$, and $B_y$, parameters as before produces the patterns of FIG. 8a):

Or, by taking $\text{Threshold}(x,y) = \text{Minimum}(\text{tri}(A_x^*x + A_y^*y), \text{tri}(B_x^*x + B_y^*y))$ we obtain the pattern of FIG. 8b):

PostScript ™ is an accepted industry standard page description language capable of integrating text, line art, and (continuous tone, sampled) images in a single document. Depending on the characteristics of the particular printer, continuous tone image data is typically converted to a halftone representation for hardcopy output. The PostScript ™ halftone mechanism is flexible enough to allow this halftone pattern generation algorithm to be implemented in a standard PostScript ™ printer (e.g., the Apple LaserWriter, Linotype Linotronic Lasersetter, etc.) without hardware modifications. Through appropriate choice of the parameters $A_x$, $A_y$, $B_x$, and $B_y$, the printed output of halftone images can be greatly improved, particularly in the case of color images.

The "para(x)" and "tri(x)" functions can be defined in PostScript by /para{
    0.007 add abs 2 div dup truncate sub 2 mul 1 exch sub abs
        dup 0.5 lt { dup mul 0.25 sub }
            { 1 sub dup mul 0.25 exch sub } ifelse
} def
/tri{
    0.007 add abs 2 div dup truncate sub 2 mul 1 exch sub abs
    0.5 mul 0.25 sub
} def These functions expect the argument "x" to be the top element on the operand stack and return the appropriate function value, "para(x)" or "tri(x)", in its place.

Note that in both cases an additive offset (0.007 in these examples, but could be any small number) is used to remove the absolute symmetry of the functions. Since the halftone patterns produced have multiple dots per cell, the slight asymmetry helps avoid redundant threshold values and promotes more homogeneous growth among the dots in a halftone cell.

The PostScript halftone cell is defined as having its center at the origin of an x,y coordinate system with corners at ±1 in x and y. Since the cell dimensions match the periodicity of the "para(x)" and "tri(x)" functions, these offsets will not otherwise affect the final halftone pattern appearance.

The original function "Threshold (x,y)" is defined in PostScript by /threshold{
    2 copy mul 0 lt {0.001}{−0.001} ifelse 3 1 roll
    0.003 add exch 2 copy Ax mul exch Ay mul add para Ecc mul
    3 1 roll Bx mul exch By mul add para add
} def The "threshold" function expects the x and y arguments to be the top two elements on the operand stack (which are removed in the calculation) and returns a single threshold value as the top element. An additive offset of 0.001 is added to or subtracted from the threshold value computed depending on whether the original x and y arguments represented a point in an even or odd quadrant of the coordinate plane and an additional additive offset of 0.003 is applied to the y argument only (again, to intentionally reduce symmetry and promote more homogeneous dots within the multiple dot per cell pattern). The "para" function in the above example is simply replaced by "tri" to alter the dot shape as described earlier. The parameters Ax, Ay, Bx, By, and Ecc are PostScript variables which are set to the desired values by (for example):

/Ax3def/Ay1def/Bx1def/By−2def/Ecc1.0def

One other parameter must be set and that is the "pitch" of the fundamental halftone cell (cells per linear inch in the printer device space). The effective halftone pattern pitch, since this algorithm produces patterns with multiple dots per cell, will be the product of this "cell pitch" with the square root of the number of dots per cell (given by $|A_x{}^*B_y - A_y{}^*B_x|$). The dots per cell for the above example parameter values is seven. If the cell pitch is set to 30 per inch (for example) with /pitch30def the effective halftone pitch will be $30^*\sqrt{7} \approx 79.3725$. After setting the parameters to their desired value, a halftone screen is "set" with the PostScript statement:

pitch0{threshold}setscreen

The second parameter "0" refers to the rotation angle of the fundamental halftone cell. Since the orientations of the rows and columns of dots are specified within the fundamental halftone cell, no rotation of the cell itself is required.

The intaglio-like dot patterns (where the parallelogram shaped dots do not join at their vertices in the midtones, but are separated by parallel lines of varying thickness) may be produced by modifying the threshold function to take the maximum of the row and column "tri(x)" functions:

/threshold {
    2 copy mul 0 lt {0.001}{−0.001} ifelse 3 1 roll
    0.003 add exch 2 copy Ax mul exch Ay mul add tri
    3 1 roll Bx mul exch By mul add tri
    2 copy lt {pop}{exch pop} ifelse add
} def Since the dots do not join at their vertices at middle gray shades for these patterns, there is no need for the eccentricity parameter "Ecc". The above threshold function produces patterns with "black" ("on") dots separated by "white" ("off") lines. The reverse effect (white dots separated by black lines) can be produced by taking the minimum rather than the maximum of the row and column "tri(x)" functions:

/threshold {
    2 copy mul 0 lt {0.001}{−0.001} ifelse 3 1 roll
    0.003 add exch 2 copy Ax mul exch Ay mul add tri
    3 1 roll Bx mul exch By mul add tri
    2 copy gt {pop}{exch pop} ifelse add
} def The only change here being a final "greater than" ("gt") test rather than "less than" ("lt").

In all cases, if a fixed pattern is desired (i.e., for monochrome printing where only one halftone pattern is required), the variables Ax, Ay, etc. in the threshold function definitions may be replaced by literal numeric constants.

The Best Experimental Mode

The use within a Matchprint ™ proof made from separation negatives exposed on a Linotype Linotronic 300 R Lasersetter at a resolution of 2540 dpi. The cell pitch for all colors was 2540/48 = 52.9167 (48 × 48 pixel halftone cell) with a "cell angle" of 0°.

The black separation used $A_x=2$, $A_y=2$, $B_x=2$, $B_y=-2$ (a basic 45° pattern). The dots per cell (from $|A_xB_y-A_yB_x|$) is 8 giving an effective pitch of $52.9167 \cdot \sqrt{8} \neq 149.67$ (close to a standard 150 line screen).

The cyan separation used $A_x=1$, $A_y=3$, $B_x=-3$, $B_y=-1$ (a "skewed" pattern with non-perpendicular "rows" and "columns" of dots. SEE top halftone pattern on PAGE 9 of DIAC RI 24.) The dots per cell is 8 giving the same effective pitch of about 149.67.

The magenta pattern is the mirror image of the cyan with $A_x=-1$, $A_y=3$, $B_x=3$, $B_y=-1$. Again dots/cell = 8 with the same 149.67 effective pitch.

The yellow pattern used $A_x=0$, $A_y=3$, $B_x=3$, $B_y=0$ (a basic 0° pattern). The dots per cell in this case is 9 giving a slightly different effective pitch of $52.9167 \cdot \sqrt{9} = 158.75$ (but the appearance of the color texture or rosette is primarily determined by the more visible black, cyan, and magenta dot patterns).

The image produced from this data exhibits an unconventional rosette, but its appearance is not objectionable and the overall 45° texture orientation helps reduce its visibility. An added feature of these patterns is a reduced sensitivity to registration errors among the various separations (a fundamental claim in the cited U.S. Pat. No. 4,758,886).

The primary advantage of this halftone pattern generation algorithm is the ability to independently specify the orientation of and dot frequencies along "rows" and "columns" of halftone dots within a simple, non-rotated square cell of addressable raster points. The algorithm does not require the number of dots to be related to the size (in addressable raster points) of the fundamental cell. While patterns based on relatively small cells may appear less noisy if the dot frequency bears some specific harmonic relationship to the addressable points per cell, patterns with many points per dot can be generated without restrictions. This flexibility allows selection of halftone screens for color printing to be made from a much broader range of patterns. Screens may be chosen to optimize performance with specific hardware as well as improve characteristics such as insensitivity to color-to-color registration errors.

The fact that the patterns are defined within a square, non-rotated fundamental cell can greatly simplify the hardware required to implement the algorithm in a halftone RIP (Raster Image Processor).

The fact that the patterns have multiple dots per cell is an advantage when printing a large range of gray shades on a relatively low resolution printer. For example: setting $A_x=2$, $A_y=2$, $B_x=2$, and $B_y=-2$ with a cell pitch of 30/inch will produce the same effective dot density as a pattern using $A_x=1$, $A_y=1$, $B_x=1$, and $B_y=-1$ with a cell pitch of 60/inch, but with four times as many shades since this depends on the number of addressable points in the fundamental halftone cell which has four times the area when the cell pitch is halved. The penalty for this added dynamic range is a small increase in noise (since all the dots within the cell cannot be identical for all shades of gray). The offsets used in the examples of a PostScript implementation of the algorithm are important in intentionally reducing the symmetry of the threshold matrix, introducing a dither mechanism among the dots in a cell to promote their homogeneous growth.

The fact that the algorithm is easily implemented on unmodified PostScript printers gives it immediate application in improving the output from a large number of existing printers.

We claim:

1. A method of producing a halftone representation of a continuous-tone or multi-level image from a set of spatial frequencies by the calculation of a threshold value within a halftone cell to determine if a particular point should be "on" or "off", comprising the steps of:

choosing halftone dot patterns in terms of directly specifying spatial frequency components, rather than in terms of dot pitch and rotation angle, by selecting a plurality of spatial frequency components and combining said plurality of spatial frequency components to direct the generation of a pattern by a bilevel printing device; and using said bilevel printing device to address discrete points in a Cartesian grid at the direction of said pattern formed by said plurality of spatial frequency components to provide a black and white halftone image.

2. The method of claim 1, wherein said threshold value is calculated by using an algorithm threshold equation of the general form:

$$\text{Threshold}(x,y) = \text{Comb\_fn}(\text{Row\_fn}(A_x{}^* x + A_y{}^* y), \text{Col\_fn}(B_x{}^* x + B_y{}^* y))$$

where "Comb_fn()" function is a rule for combining the "Row_fn()" and "Col_fn()" functions such as summation, multiplication, or comparison; and the "Row_fn()" and the "Col_fn()" functions are periodic functions with period $[-1,1]$ matching that of a fundamental halftone cell; thus giving arguments to the "Row_fn()" and "Col_fn()" functions, $(A_x{}^*x + A_y{}^*y)$ and $(B_x{}^*x + B_y{}^*y)$, respectively, determining how "rows" and "columns" of halftone dots are arranged within the cell, and allowing the patterns to be given in terms of spatial frequencies.

3. The method of claim 2, wherein said "Comb()" function is a simple summation of said "Row_fn()" and said "Col_fn()", with a multiplicative factor "Ecc" that can be used to weight said "Row_fn()" relative to said "Col_fn()", and wherein said "Row_fn()" and said "Col_fn()" are "para()" functions, wherein said "para()" function is a periodic splicing of parabolic sections, thereby leading to the threshold equation:

$$\text{Threshold}(x,y) = Ecc^*\text{para}(A_x{}^*x+A_y{}^*y) + \text{para}(B_x{}^*x+B_y{}^*y)\text{''},$$

thereby leading to distortions of dot shapes to cause chaining or linking of the rows or columns of dots in midtone shades.

4. The method of claim 2, wherein said "Comb()" function is a simple summation of said "Row_fn()" and said "Col_fn()" with a multiplicative factor "Ecc" that can be used to weight said "Row_fn()" relative to said "Col_fn()", and wherein said "row_fn()" and said "Col_fn()" are periodic $[-1,1]$ triangle functions, "tri()", thereby leading to the threshold equation:

$$\text{Threshold}(x,y) = Ecc^*\text{tri}(A_x{}^*x+A_y{}^*y) + \text{tri}(B_x{}^*x+B_y{}^*y)\text{''},$$

and thereby creating consistent parallelogram shades.

5. The method of claim 2, wherein said "Comb()" function is to be the minimum or maximum of the "Row_fn()" and "Col_fn()" functions.

6. The method of claim 1, wherein said plurality of spatial frequency components are defined for a rectangular array.

7. The method of claim 6, wherein said patterns consist of a multiplicity of halftone dots within each fundamental cell which lead to larger cells with finer effective dot spatial densities.

8. The method of claim 6, wherein said patterns defined within the fundamental halftone cells are unrestricted in terms of any required relationships between the spatial frequency components of the dot rows and columns and the size in addressable raster points of the fundamental halftone cell.

9. The method of claim 8, wherein said patterns consist of a multiplicity of halftone dots within each fundamental cell, further including a method of introducing a dither mechanism between the multiplicity of dots, wherein said dither mechanism includes the use of coordinate offsets to intentionally reduce symmetry of the dot patterns relative to the addressable raster point coordinate system.

10. The method of claim 9, wherein said dither in turn promotes more homogeneous growth among the multiplicity of dots in the fundamental halftone cell.

11. The method of claim 1, wherein the pattern generated from said spatial frequency components is provided by using a periodic function defined with simple quadratic polynomial sections.

* * * * *

UNITED STATES PATENT AND TRADEMARK OFFICE
CERTIFICATE OF CORRECTION

PATENT NO. : 5,253,084
DATED : October 12, 1993
INVENTOR(S) : Richard L. Rylander It is certified that error appears in the above-indentified patent and that said Letters Patent is hereby corrected as shown below:

Col. 3, line 28, "These" should read --There--

Col. 8, line 31, "$A_y = B_y$," should read --$A_y = -B_y$--

Col. 9, line 37, "cisine" should read --cosine--

Col. 13, line 4, "$\neq$" should read --$\approx$--

Signed and Sealed this

Sixth Day of September, 1994

Attest:

BRUCE LEHMAN

Attesting Officer    Commissioner of Patents and Trademarks